United States Patent [19]

Shiel et al.

[11] 4,066,469

[45] Jan. 3, 1978

[54] RAPID HARDENING CEMENT

[75] Inventors: Leslie Edward Shiel, Gravesend; Kenneth Wilson Jones, Meopham, both of England

[73] Assignee: The Associated Portland Cement Manufacturers Limited, London, England

[21] Appl. No.: 732,602

[22] Filed: Oct. 15, 1976

Related U.S. Application Data

[63] Continuation of Ser. No. 583,796, June 4, 1975, abandoned.

[51] Int. Cl.$^2$ .......................... C04B 7/02; C04B 7/35
[52] U.S. Cl. ........................................ 106/89; 106/90; 106/97; 106/315

[58] Field of Search ............... 106/89, 90, 97, 314, 106/315

[56] References Cited

U.S. PATENT DOCUMENTS

| | | | |
|---|---|---|---|
| 1,296,467 | 3/1919 | Blumenberg | 106/89 |
| 2,374,581 | 4/1945 | Brown | 106/89 |
| 3,118,779 | 1/1964 | Leonard | 106/89 |
| 3,782,984 | 1/1974 | Allemand et al. | 106/90 |
| 3,865,601 | 2/1975 | Serafin et al. | 106/90 |

*Primary Examiner*—J. Poer
*Attorney, Agent, or Firm*—Diller, Brown, Ramik & Wight

[57] ABSTRACT

A gypsum-free ultra-rapid hardening Portland Cement ground to a specific surface area of 3000 to 7000 cm$^2$/g and containing a minor proportion of an acid salt of an alkali metal, ammonium or organic base.

9 Claims, No Drawings

RAPID HARDENING CEMENT

This is a continuation of application Ser. No. 583,796, filed June 4, 1975, now abandoned.

The present invention relates to a composition for an ultra-rapid hardening Portland cement, more particularly to an ultra-rapid hardening Portland cement composition containing gypsum.

Normal Portland cements are manufactured by burning an intimately blended mixture of calcareous and argillaceous raw materials to a clinker and grinding this clinker with a small proportion of gypsum to a fine powder. The gypsum is conventionally employed to retard, and thus provide a measure of control over, the setting time of the cement when combined with water.

The setting times and rates of strength development attained by ordinary Portland cement, and by so-called rapid hardening cements produced by extra fine grinding of the ingredients, are, however, not sufficiently fast for some applications such as the laying of a factory floor where placing, setting and hardening is required to proceed at such a rate that output from the factory is disrupted as little as possible.

Typical setting times for known rapid hardening Portland cement are for instance 150 minutes for initial set and 210 minutes to final set.

It is an object of the invention to provide an ultra-rapid hardening Portland cement composition with rates of hardening substantially greater than those achieved with Portland cements hitherto and with setting properties which can be regulated.

Certain disadvantages are associated with the use of gypsum as a retarder of setting time in this connection, e.g.: high water-demand, particularly when the gypsum contains clay, which also interferes with the retarding characteristics; and a tendency to produce false set because of the formation of hemi-hydrate under the influence of heat developed in milling. These disadvantages are exacerbated with cement that has been ground more finely to produce rapid hardening, because larger proportions of gypsum are then required to produce by retardation the desired control of setting.

It is accordingly a further object of the invention to provide an ultra-rapid hardening Portland cement composition with a regulated setting rate but containing no gypsum.

According to the present invention a gypsum-free Portland cement composition for an ultra-rapid hardening cement contains a minor proportion by weight based on the total composition of at least one acid salt, other than a phosphorus compound, of an alkali metal or ammonium or of an organic base such as an amine, preferably in a proportion of from 0.1 to 10 percent by weight, and most preferably 1.0 to 5.0 percent by weight, of the mixture; the cement being ground to exhibit a specific surface of from 3000 to 7000 cm$^2$/g (Blaine), preferably 4000 to 6000 cm$^2$/g, gypsum being excluded from the composition.

A particular advantage of excluding gypsum lies in the fact that compounds of potassium can be usefully employed without risking the formation of syngenite by interaction of gypsum and potassium with attendant loss of workability.

Retarders other than gypsum may be incorporated in the composition, such as hydroxy carboxylic acids or lignosulphonates such as calcium lignosulphonate, for instance, in amounts of from 0.05 to 2 percent of the mixture. In some applications such as patching or gunnite rendering, retarders are necessary at most in only small amounts, if at all. The retarder is preferably one having a plasticising effect whereby water : cement ratios are reduced and product strengths increased. The proportion of retarder required may also vary according to the particular acid salt or salts employed.

The acid salt acts to accelerate or catalyse the hydration of the cement and is varied in amount according to the rapidity of hardening required. Setting times of the order of a few minutes to a few hours are attained with compositions according to the invention, without incurring an uneconomic degree of fine grinding and without sacrificing control.

Examples of the acid salts to be used in the invention include the bicarbonates, bisulphates and bisulphites of sodium, potassium and ammonium. It will be appreciated that the use of acid phosphates as the acid salts is excluded, since phosphates have a characteristically powerful retarding property peculiar to them.

The ingredients to be added to the cement may be incorporated at any stage before setting as long as they are thoroughly mixed in, but it is most convenient to add them at the clinker grinding stage.

The following Examples are given for the purpose of illustrating the invention. Cement compositions were made up by incorporating various acid salts with calcium lignosulphonate in an ordinary Portland cement ground to a specific surface area of 5500 cm$^2$/gm. Mortar was produced from the cement composition having a sand/cement ratio by weight of 3 : 1 and a water/cement ratio of 0.6, using Curtis sand graded to ASTM specification, i.e., 30 percent - 52 + 100 mesh, 70 percent - 25 + 52 mesh. The mortars were then tested for compressive strength (1-inch cube). The compositions and respective strengths exhibited are shown in the Table following.

By way of comparison the corresponding strengths are given for two samples of ordinary Portland cement and one sample of "Swiftcrete", a cement rendered rapid hardening essentially by fine grinding to about 6000 to 8000 cm$^2$/g.

TABLE

| Example | Acid Salt percent | Retarder: Calcium lignosulphonate percent | Compressive Strength lb/in$^2$ | |
|---|---|---|---|---|
| | | | 1 day | 7 days |
| 1. | KHSO$_4$ 1.0 | 0.1 | 2350 | 4400 |
| 2. | KHSO$_4$ 2.5 | 0.1 | 2785 | 5000 |
| 3. | KHSO$_4$ 5.0 | 0.1 | 3750 | 5300 |
| 4. | KHSO$_3$ 5.0 | 0.1 | 3075 | 4100 |
| 5. | NaHSO$_3$ 2.5 | 0.1 | 2275 | 4150 |
| 6. | KHCO$_3$ 1.0 | 0.1 | 2150 | 4300 |
| 7. | KHCO$_3$ 2.5 | 0.1 | 3400 | 4400 |
| 8. | KHCO$_3$ 5.0 | 0.1 | 3400 | 4150 |
| 9. | KHSO$_4$ 2.0 / KHCO$_3$ 1.0 | 0.1 | 2000 | 3850 |
| 10 | KHSO$_4$ 1.0 / KHCO$_3$ 2.0 | 0.1 | 1800 | 4700 |
| 11. | KHSO$_4$ 1.5 / KHCO$_3$ 1.5 | 0.1 | 3100 | 4150 |
| 12 | NaHSO$_4$ 5.0 | 0.1 | 3400 | 5700 |
| 13 | NaHSO$_4$ 5.0 | 0.1 | 3350 | 7300 |

The rate of hardening can be adjusted as desired by suitable variation of the degree of grinding, or of the proportion of additive used, from the values used in the foregoing Examples, in the manner familiar in the art,

We claim:

1. A gypsum-free cement composition exhibiting ultra-rapid attainment of high early strength as compared with ordinary Portland cement containing gypsum, and with setting properties which can be regulated, which composition consists essentially of a Portland cement clinker, which does not contain gypsum, ground to exhibit a specific surface of from 3000–7000 cm$^2$/g, and at least one acid salt of a base in amount sufficient to impart said ultra-rapid attainment of high early strength, said acid salt of a base being selected from the group consisting of alkali metals, ammonium and organic bases with a phosphorous-free acid and being present in amount of 0.1–10% by weight of said clinker.

2. A composition according to claim 1, ground to exhibit a specific surface of from 4000 to 6000 cm$^2$/g.

3. A composition as defined in claim 2 wherein said acid salt is selected from the group consisting of bicarbonates, bisulphates and bisulphites of sodium, potassium and ammonium and mixtures thereof.

4. A composition as defined in claim 1 wherein said acid salt of a base is present in amount of 1.0–5%.

5. A composition as defined in claim 2 wherein said acid salt of a base is present in amount of 1.0–5%.

6. A composition as defined in claim 3 wherein said acid salt of a base is present in amount of 1.0–5%.

7. A composition according to claim 6, ground to exhibit a specific surface of from 4000 to 6000 cm$^2$/g.

8. The method of making a gypsum-free cement composition exhibiting ultra-rapid attainment of high early strength as compared with ordinary Portland cement containing gypsum, and with setting properties which can be controlled, which comprises the steps of:
   a. grinding Portland cement clinker, in the absence of gypsum, to exhibit a specific surface of from 3000–7000 cm$^2$/g;
   b. controlling the hardening rate of said composition by incorporating in said ground clinker from 0.1–10% by weight of at least one acid salt of a base selected from the group consisting of alkali metals, ammonium and organic bases with a phosphorous-free acid; and
   c. controlling the setting time of said composition by incorporating therein a retarding agent such as hydroxy carboxylic acids and lignosulphonates in amount of 0.05–2% by weight.

9. A gypsum-free cement composition having ultra-rapid hardening to high early strength and controlled setting properties made according to the method of claim 8.

* * * * *